(12) United States Patent
Ragan et al.

(10) Patent No.: US 7,159,490 B2
(45) Date of Patent: Jan. 9, 2007

(54) BOTTLE INJECTOR

(76) Inventors: Philip J. Ragan, 477 Townley Hill Rd., Horseheads, NY (US) 14845; Brandon Ragan, 477 Townley Hill Rd., Horseheads, NY (US) 14845

( * ) Notice: Subject to any disclaimer, the term of this patent is extended or adjusted under 35 U.S.C. 154(b) by 0 days.

(21) Appl. No.: 11/388,674

(22) Filed: Mar. 24, 2006

(65) Prior Publication Data

US 2006/0162501 A1    Jul. 27, 2006

Related U.S. Application Data

(63) Continuation-in-part of application No. 10/903,706, filed on Jul. 30, 2004, now Pat. No. 7,047,841.

(51) Int. Cl.
*B60C 27/06* (2006.01)
(52) U.S. Cl. ..................................... 81/15.6
(58) Field of Classification Search ............... 81/15.6, 81/15.2, 15.5
See application file for complete search history.

(56) References Cited

U.S. PATENT DOCUMENTS

| 603,045 | A | * | 4/1898 | Palmer | 81/15.6 |
| 1,521,612 | A | * | 1/1925 | Freedman | 81/15.6 |
| 2,646,707 | A | * | 7/1953 | Notz | 152/367 |
| 3,563,240 | A | * | 2/1971 | Silver | 604/87 |
| 5,472,031 | A | * | 12/1995 | Austin | 152/415 |
| 7,047,841 | B1 | * | 5/2006 | Ragan et al. | 81/15.6 |

* cited by examiner

*Primary Examiner*—Lee D. Wilson
(74) *Attorney, Agent, or Firm*—Frank A. LaViola, Jr.

(57) ABSTRACT

The invention relates to a bottle injector for injecting fluids. The present invention uses a bottle reservoir connected to a long, flexible tube, which is in turn attached to a connector. A plunger mechanism expels the fluid located within the reservoir through the tube and connector. One use for the bottle injector can be to inject tire sealant into a tire. The connector can have two different threads, Schrader and Presta, to accommodate both types of valve stems currently found on tires. The Schrader type threads are larger than the Presta type threads and thus the Presta type threads are positioned further into the connector than the Schrader type threads. The larger, Schrader type threads are used on automobiles and less expensive bicycles. The Presta threads are more common in Europe and are used on most high performance bicycles. One of the main advantages of the present invention is that an exact amount of fluid can be dispensed; there is no waste because spillage is eliminated and the device uses no external power source to dispense the fluid. The bottle injector can be used on bicycles, utility vehicles, ATVs, lawn and garden tractors, wheelbarrows, golf carts and even automobiles. The bottle injector is not limited to the injection of tire sealant into tires. The connector with threads can be replaced with other types of connectors to allow for other applications.

10 Claims, 5 Drawing Sheets

BOTTLE INJECTOR

CROSS REFERENCE TO RELATED APPLICATION

This application is a continuation-in-part of U.S. application Ser. No. 10/903,706 filed on Jul. 30, 2004 now U.S. Pat. No. 7,047,841.

FIELD OF THE INVENTION

The invention relates to a bottle injector for fluid having a syringe type plunger for dispensing the fluid in the bottle. While the invention is shown as an injector for tire sealant into a tire, any fluid can be used with the present invention. The invention can be used to both seal a tire puncture and also to help prevent future tire punctures and leaks.

BACKGROUND OF THE INVENTION

The present invention solves many problems that face any type of tire repair as it relates to punctures and leaks. Originally the field of bicycling was the primary field of use for the present invention. It was determined that a variety of other applications includes also well within the scope of the present invention. Other applications could include: ATV's, utility vehicles, lawn and garden tractors, wheelbarrows, golf carts and automobiles but are not limited to those listed. The invention grew out a need for a simple, more accurate and less messy way of injecting puncture sealant into a tire which has either lost its air or has otherwise become unable to hold the air which is put into it. A further development of the invention came when it was found that there are two types of valve stems in conventional bicycle tires. The Schrader type of valve stem is of a larger diameter and has a different set of threads than its smaller Presta counterpart. The present invention has a connector which can accommodate both the Schrader and Presta valve stem arrangements without the need for changing or adapting the end of the unit. The tire sealant of the present invention was designed with the everyday user, such as a homeowner or casual biking enthusiast in mind. The device is capable of larger, commercial applications as well.

A bottle type container can be used to hold a variety of fluids and can be sold in a kit form with the plunger mechanism, hose and connector. The initial amount of fluid can be sold in the bottle within the kit and can be repeatedly refilled after the original fluid has been dispensed.

The prior art known consists mainly of either an aerosol type of injector system or a device that needs to be hooked up to an external power source to provide the injecting means for depositing the sealant into the tire. Both have deficiencies that the present invention does not. The present invention forms a leak-free connection with the valve stem regardless of the type of stem encountered. Traditional ways of injecting sealant into tires creates a messy situation as excess sealant runs down the valve stem and requires extensive clean up. Virtually all of the sealant used with the present invention is deposited into the tire and thus none is wasted. This waste causes money to be lost and additional time is spent cleaning up after use. The present invention has neither of these problems. The second main advantage of the present invention is one of simplicity. The tire sealant injector of the present invention does not rely on any external power source, such as a pump, to dispense the fluid. This is not only costly to do but also has to be done in the vicinity of electric power which may or may not always be available. The tire sealant injector of the present invention is an improvement over the manual squeeze bottle type which is known in the art. The squeeze bottle method has the major drawback of having to wait for the air refill the reservoir after the first squeeze. Hand fatigue is a major problem with the squeeze bottle type of dispenser since it takes several pumps to inject enough sealant into the tire. This can be very time consuming as a set of four tires can take up to 45 minutes to 1 hour to fix. Four tires can be sealed in less than 15 minutes with the tire sealant injector of the present invention.

The present invention allows for a controlled, measured amount of sealant to be injected into the tire with out the mess and waste of the conventional systems known today. The U.S. Pat. No. 5,908,145 to Jaksa show a typical system for injecting sealing fluid into a tire which includes a valve stem connector, reservoir chamber and a flexible hose connecting the two. Jaksa also shows a set of fittings which connect to a source of compressed air or pump to inject the sealant into the tire. The invention of Jaksa is both more costly than the present invention and relies on an outside agent (compressed air from a pump or compressor) to inject the sealing fluid into the tire. This is a typical construction for many of the prior art documents in this field. It should also be pointed out that the device of Jaksa makes no provision for servicing both Schrader and Presta type valve stems. The U.S. Pat. No. 5,012,954 to Will shows a tire inflation system using a compressed gas to fill a tire with air. Will does not make any attempt to fix a puncture but rather a way of inflating a brand new tube when positioned within a tire. The only significant thing in this patent is that an adapter is used to accommodate both Schrader and Presta type valve stems.

OBJECTS OF THE INVENTION

It is an object of the present invention to provide a simple, efficient and cost effective device for injecting tire sealant into a tire.

It is another object of the present invention to provide a way of sealing a puncture in a tire without wasting tire sealant and also providing a way to measure and control the amount of sealant being injected into the tire.

It is a further object of the invention to allow for all skill levels of user to effectively use the invention and not to have to rely upon external sources for successful completion of the sealant insertion.

Another object of the invention is to provide a bottle type injector, which is refillable, allowing for repeated use of the invention. Any fluid can be used and injected with the present invention.

SUMMARY OF THE INVENTION

The following description comprises an improved mechanism for injecting tire sealant into a punctured or leaking tire. While the use of tire sealant fluid is considered to be the main purpose of the invention, it is in no way limited to this particular application. Any fluid which is capable of being injected can be used with the present invention.

The injection of fluid can be preventative as well as to fix a flat tire. It will become necessary, from time to time to add sealant to the tire for preventative maintenance. The device of the present invention makes this addition of sealant quick and easy. The present invention is concerned with injecting the fluid into the tire only. The tire must then be filled with air by any known conventional way such as, a manual pump or the like. While bicycle tires are to be mentioned heavily for the purpose of demonstration, the present invention is in no way limited to bicycles. The present invention can easily be used with ATVs, utility vehicles, lawn and garden tractors, wheelbarrows, golf carts and even automobiles. The present invention was for use primarily with tubeless tires but can also be quite effective in the repair of tires with tubes.

The present invention consists of a syringe type chamber or bottle type reservoir with a plunger type dispensing apparatus connected to a flexible tube at one end and on the other end of the flexible tube is a valve stem connector. The valve stem connector, while necessary for injecting tire sealant into a tire, can be replaced with any other type of tip to inject fluid. The details of all the elements and the combination of the elements will be described later. When injecting tire sealant, one key element of the invention is the ability to adapt to both Schrader and Presta type valve stems without changing or manipulating the device. Another key element of the invention is that the injector is a very accurate way of injecting a known and controlled amount of sealant into a tire. The shortcoming of the known aerosol type or "fix a flat" type of devices is that there is no way of knowing how much of the solution is inside the tire. It is usually recommended that the entire contents of the container be used. This is entirely too much for a bicycle tire or wheelbarrow tire. These aerosol type of dispensers were designed for automobiles or trucks. The "fix a flat" type of aerosol cannot be refilled and must be discarded after use. A further key advantage of the present invention is that the bottle or syringe type chamber is refillable for repeated use. The present invention is versatile enough to work on virtually any type of tire and is adaptable to be used for other fluid dispensing needs.

BRIEF DESCRIPTION OF THE DRAWINGS

Reference will be made to the accompanying drawings wherein like numerals refer to like parts throughout and in which.

DETAILED DESCRIPTION OF THE PREFERRED EMBODIMENT

Figure 1:
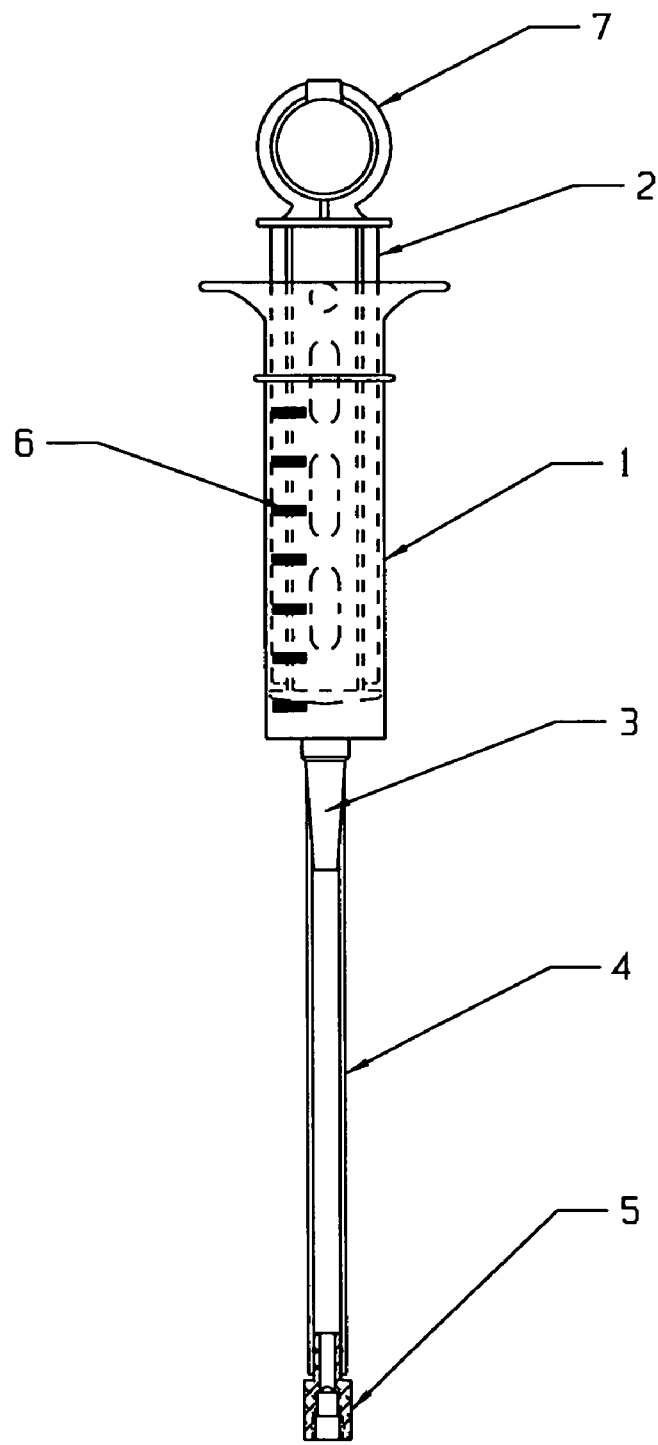
FIG. 1 shows the present invention in its full syringe type form.

In FIG. 1, the elements shown are arranged in a preferred form. Sealant reservoir 1 has a plunger mechanism 2 positioned within its chamber. The plunger mechanism is shown to have a ring type end 7 but it should be stated that any type of end can be used. The outer walls of the sealant reservoir 1 have level indicator markings 6 so as to aid in achieving the proper filling level depending upon the size and style of the tire to be filled. The sealant reservoir 1 is that of a syringe type whereas the outer syringe forms the reservoir and the plunger mechanism 2 acts to both draw the sealant from its container and to expel the sealant through the hose connector 3 positioned at the sealant reservoir end. Connected to the hose connector 3 is a flexible hose or tubing 4. It is preferable that the tubing 4 is clear so as to make sure all the sealant has been dispensed but the tubing 4 can be opaque. While size, shape and color are not critical to the functioning of the sealant injector, making at least the sealant reservoir 1 and the tubing 4 out of clear plastic would be beneficial. The cross sectional shape of the sealant reservoir 1 can be round, square, hexagonal or any other shape as long as the plunger mechanism 2 can be of similar shape and form a seal with the sides of the reservoir 1. Located at the distal end of the tubing 4 is a valve stem connector 5 which is shown in greater detail in FIG. 2 and FIG. 3.

Figure 2:
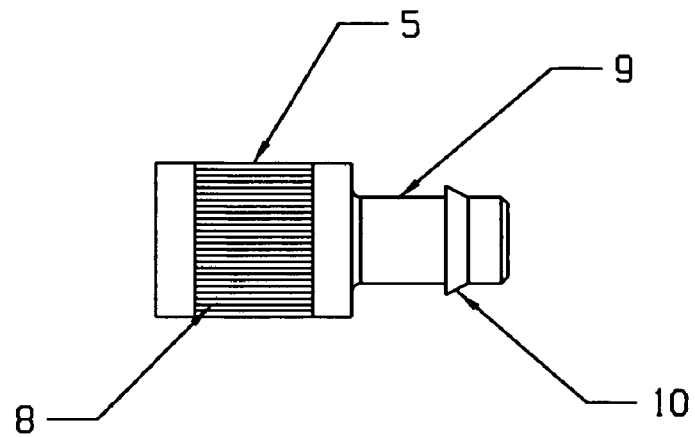
FIG. 2 shows a detailed view of the valve stem connector piece or the device of FIG. 1.
Figure 3:
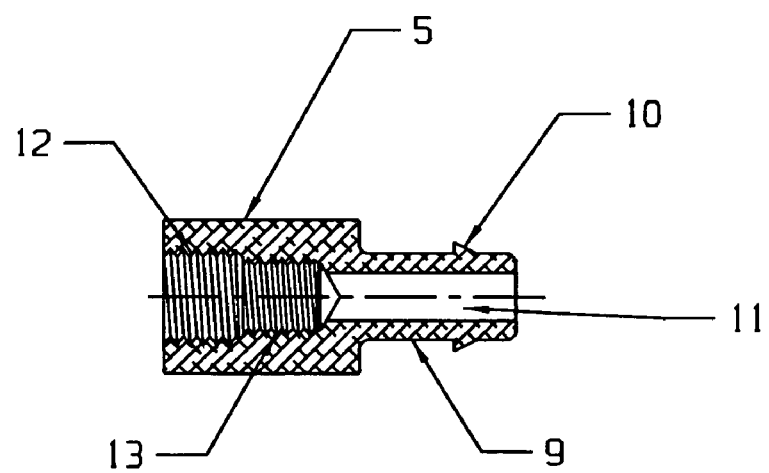
FIG. 3 shows a cross-sectional view of the valve stem connector piece of FIG. 2 to show both the Schrader and Presta type of thread configurations.

Turning now to FIG. 2, the valve stem connector 5 is of round cross section and has a knurled portion 8 along a portion of its exterior. This knurled portion 8 is to allow for the user to grip the valve stem connector 5 when it is being attached to a valve stem. The valve stem connector 5 has one end of greater diameter than the other. The knurled portion 8 is shown on the end with the greater diameter. The smaller diameter end or tubing connector end 9 has a barbed end area 10 to positively engage the tubing 4 when it is positioned over the tubing connector end 9. In FIG. 3, the valve stem connector 5 is shown in cross sectional view so as to see that there is a bore 11 completely through the valve stem connector 5. Also shown in FIG. 3 are the two types of threads, the Schrader thread 12 being the one that is larger in diameter and the Presta thread 13 which is the smaller of the two threads. It is seen that both the threads are axially aligned and concentric with each other. The valve stem connector can be made of plastic, aluminum or any other suitable material which can handle threading. Plastic is the most cost effective material and is the material of choice for cost effectiveness, weight and durability.

Figure 4:
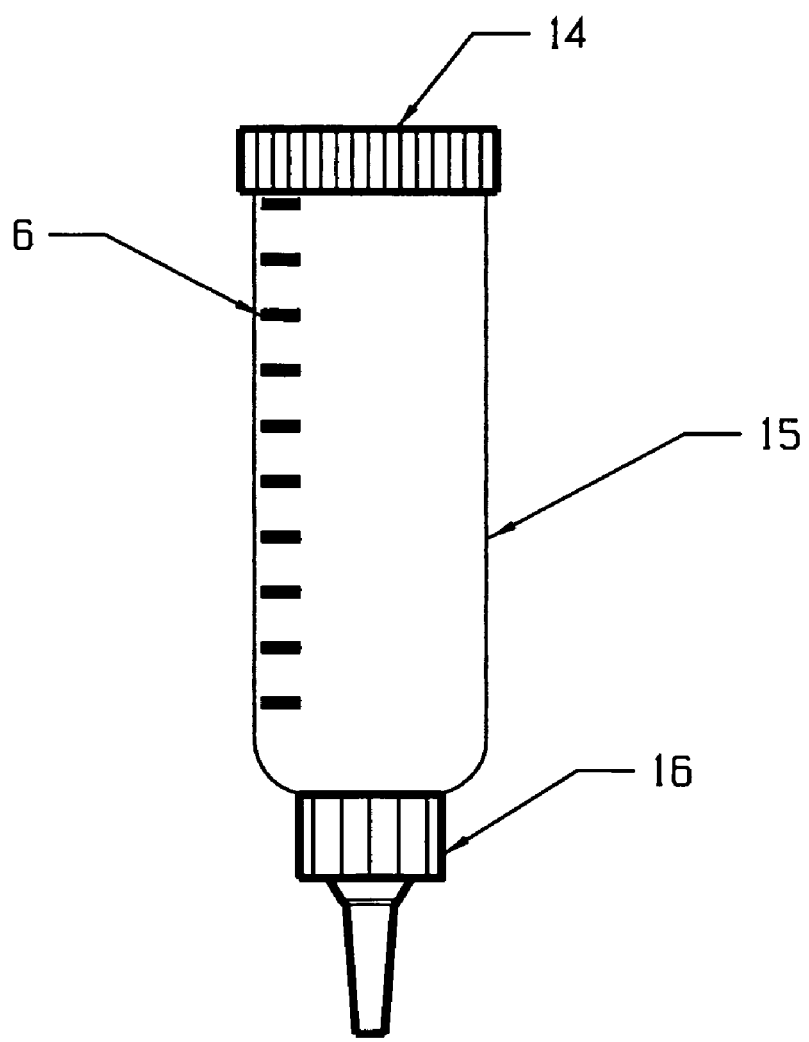
FIG. 4 shows a bottle type container with removable caps on both ends for filling a refilling the dispensing chamber.
Figure 5:
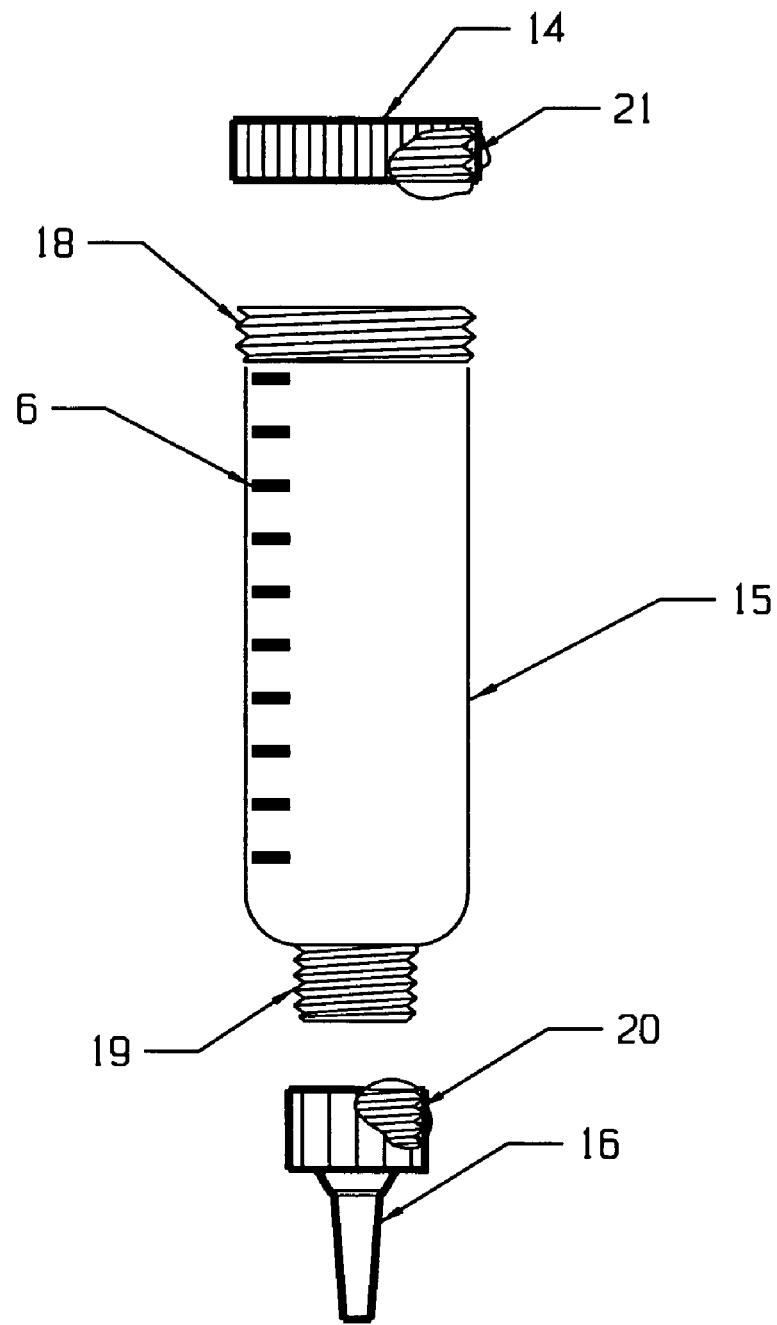
FIG. 5 shows the bottle type container with the threaded caps at both ends removed for clarity.
Figure 6:
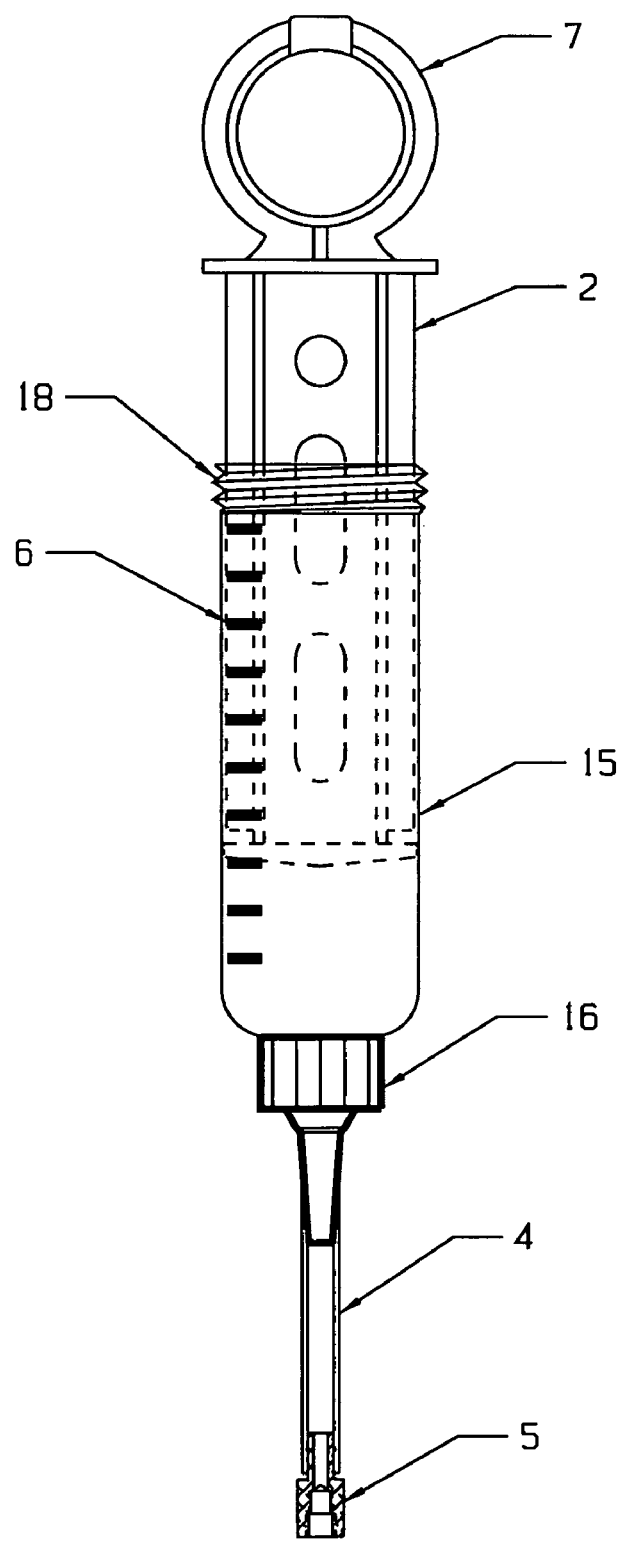
FIG. 6 shows the present invention in its bottle type form.

In FIG. 4 and FIG. 5, a bottle type reservoir 15 is shown. At one end of the bottle 15 is a threaded cap 14. This threaded cap 14 is removable and is used as an access for the plunger mechanism 2 as shown in FIG. 6. Through this end the bottle type reservoir 15 can be refilled and cleaned. At the opposite end from the threaded cap 14 is a nozzle cap 16. This nozzle cap 16 is also removable for cleaning purposes between uses. Threaded portions 18 and 19 are shown in FIG. 5 and engage the appropriate threaded portion 21 of cap 14 and threaded portion 20 of nozzle cap 16, respectively.

In FIG. 6, the bottle injector is shown in its fully assembled form. The flexible hose 4, valve stem connector 5, level indicator markings 6 and ring type end 7 have already been described above. Their use in FIG. 6 is the same as in FIG. 1 and will not be described further. It is a feature of the present invention to be sold as a kit with the initial amount of fluid sealed in the bottle 15. The plunger mechanism 2 along with the hose 4 and connector 5 would be sold along with the bottle 15. The bottle injector is then assembled as shown in FIG. 6 and is ready to use.

When used to inject tire sealant into a tire, first the valve core must be removed from the valve stem. This removal can be done by any of a number of conventional means and thus will not be discussed further. It should be pointed out at this point that the tire sealant injector of the present invention can be used with the tire being either mounted on the vehicle or separated from the vehicle. The valve stem of the tire can also be in any position, even at the top of the tire. Once the valve core has been removed, the valve stem connector end 5 of the present invention is positioned within a container of sealant. Next the plunger mechanism 2 is drawn outward from the sealant reservoir 1 to draw the sealant into the chamber of the sealant reservoir 1. The level indicator markings 6 can be used to determine when enough sealant has been drawn to complete the tire sealing process. This amount is directly proportional to the size of the tire being worked on. Once the desired amount of sealant is within the chamber of the sealant reservoir 1, valve stem connector 5 is positioned over the core-less valve stem until either the Schrader thread 12 or Presta thread 13 becomes engaged. The valve stem connector 5 is then screwed onto the valve stem until snug. Now you can depress the plunger mechanism 2 to expel the sealant into the tire through the valve stem. Once the sealant is completely expelled, the valve stem connector 5 is unscrewed and removed and the valve core can be re-inserted. The sealant filled tire should then be rotated a few times to completely coat the inside of the treated area. Finally, the tire can be re-inflated to the proper pressure and the tire sealant injector can be cleaned and stored for later use.

When using the bottle injector as shown in FIG. 6, the steps are slightly altered. If the bottle 15 is already full of fluid, the threaded cap 1, is removed and the plunger mechanism 2 is inserted into the end. If the bottle 15 is empty, the threaded cap 14 is removed to fill the bottle with the fluid to be injected. After this is done, the plunger mechanism 2 is inserted into the end. The hose 4 and connector 5 are attached to the end of nozzle end 16. The plunger mechanism 2 can then be depressed axially to push the fluid through hose 4 and connector 5 and into the intended receiver.

We claim:

1. A bottle injector for injecting fluids, the bottle injector comprising:
   a bottle having a chamber for receiving fluid, said chamber having an inside and an outside surface, said chamber further having a first end, a second end and an axial length;
   a plunger means positionable within said chamber and movable along the axial length of said chamber to form a seal with the inside surface of said chamber;
   a threaded cap positioned at said first end of said chamber and removably attached thereto;
   a nozzle cap positioned at said second end of said chamber;
   a length of tubing having a first and second end, said first end being attached to said nozzle cap;
   a connector means, said connector means having a length and being connected to said second end of said tubing, said connector means having an internal bore through said length to allow fluid to pass through whereby fluid is dispensed through said tubing and connector means when said plunger means is positioned within said chamber and depressed.

2. The bottle injector of claim 1, wherein said internal bore of said connector means has at least one set of threads to engage threads of a tire valve stem.

3. The bottle injector of claim 2, wherein said outside surface of said chamber has graduation markings along its length to aid in determining the amount of fluid in the chamber.

4. The bottle injector of claim 2, wherein said valve stem connector has a knurled outer portion to provide a gripping surface to a user.

5. The bottle injector of claim 1, wherein said internal bore has a first set of female threads and a second set of female threads located within said internal bore, said first set of threads being Schrader threads and said second set of threads being Presta threads.

6. The bottle injector of claim 5, wherein said Schrader type threads are located at an outer most end of the internal bore and said Presta type threads are located further inside said internal bore.

7. The bottle injector of claim 1, wherein said outside surface of said chamber has graduation markings along its length to aid in determining the amount of fluid in the chamber.

8. The bottle injector of claim 1, wherein said connector means has a knurled outer portion to provide a gripping surface to a user.

9. The bottle injector of claim 1, wherein said plunger means has a plunger ring positioned at an outer end of said plunger means to provide an area for gripping when expelling fluid.

10. The bottle injector of claim 1, wherein said connector means has a barbed end to receive said second end of said tubing to more positively attach said tubing to said connector means.

* * * * *